United States Patent [19]
Fukuzumi

[11] Patent Number: 5,845,066
[45] Date of Patent: Dec. 1, 1998

[54] SECURITY SYSTEM APPARATUS FOR A MEMORY CARD AND MEMORY CARD EMPLOYED THEREFOR

[75] Inventor: Tomoya Fukuzumi, Tokyo, Japan

[73] Assignee: Mitsubishi Denki Kabushiki Kaisha, Tokyo, Japan

[21] Appl. No.: 707,377

[22] Filed: Sep. 4, 1996

[51] Int. Cl.⁶ .................................................. G06F 12/14
[52] U.S. Cl. ........................................................ 395/186
[58] Field of Search ........................... 395/186, 188.01; 380/3, 4, 20; 364/222.5, 286.4, 286.5, 479.07, 246.9; 711/163, 164

[56] References Cited

U.S. PATENT DOCUMENTS

| | | | |
|---|---|---|---|
| 5,282,247 | 1/1994 | McLean et al. | 380/4 |
| 5,432,851 | 7/1995 | Scheidt et al. | 380/25 |
| 5,469,564 | 11/1995 | Junya | 395/188.01 |
| 5,533,125 | 7/1996 | Bensimon et al. | 380/4 |
| 5,537,544 | 7/1996 | Morisawa et al. | 395/188.01 |
| 5,623,637 | 4/1997 | Jones et al. | 395/491 |
| 5,629,981 | 5/1997 | Nerlikar | 380/25 |
| 5,694,471 | 12/1997 | Chen et al. | 380/25 |
| 5,721,780 | 2/1998 | Ensor et al. | 380/25 |

*Primary Examiner*—Robert W. Beausoliel, Jr.
*Assistant Examiner*—Stephen C. Elmore

[57] ABSTRACT

In a security system apparatus for a memory card used in an information processing apparatus, the memory card has an enciphering control data storing section which stores enciphering control data from which a predetermined password can be obtained by decoding, a main memory section, storing the data from the information processing apparatus, a comparison password storing section which stores a reference password, a password comparison section which compares the reference password with the password from the information processing apparatus, and an access control section for controlling access to main memory section. The information processing apparatus is provided with a data decoding section for decoding the enciphering control data. The information processing apparatus outputs the decoded password to the password comparison section and the access control section prohibits the access to the main memory section unless passwords coincide with each other as a result of the comparison by the password comparison section.

20 Claims, 10 Drawing Sheets

SECURITY SYSTEM APPARATUS FOR A MEMORY CARD AND MEMORY CARD EMPLOYED THEREFOR

BACKGROUND OF THE INVENTION

1. Field of the Invention

The present invention relates to a security system for memory cards used in an information processing apparatus such as automated office equipment and personal computers.

2. Description of the Prior Art

FIG. 14 is a schematic block diagram showing an example of a conventional memory card. In FIG. 14, a memory card 50 includes a card controller 51, a common memory 52, and an attribute memory 53. The card controller 51 is connected to an external information processing apparatus 60 with a bus comprised of an address bus 78, a data bus 76, and a control bus 77. Furthermore, the card controller 51 is connected to common memory 52 and attribute memory 53 respectively with an internal address bus 71, an internal data bus 70, and an internal control bus 72. Common memory 52 is composed of RAM for storing data input from the information processing apparatus 60, and attribute memory 53 is a non-volatile memory wherein a predetermined card attribute information (CIS) is stored in advance.

FIG. 15 is a schematic block diagram showing an example of card controller 51. In FIG. 15, card controller 51 is comprised of an address decoder/buffer 54 having an address buffer and an address decoder, a data bus buffer 55, and a card mode control unit 56. Address decoder/buffer 54, data bus buffer 55, and card mode control unit 56 are respectively connected to the information processing apparatus 60 with an address bus 78, a data bus 76, and a control bus 77. The address decoder/buffer 54 is connected to the common memory 52, the attribute memory 53, and the card mode control unit 56, respectively, with an internal address bus 71. The data bus buffer 55 is connected to common memory 52 and attribute memory 53 with an internal data bus 70, and the card mode control unit 56 is connected to common memory 52 and attribute memory 53 with an internal control bus 72.

In FIGS. 14 and 15, the address data output from external information processing apparatus 60 is input to common memory 52 and attribute memory 53 and also to the card mode control unit 56 via address decoder/buffer 54. Card mode control unit 56 outputs the chip select signal generated from the input address data together with the write enable signal and the output enable signal input from the external information processing apparatus 60 respectively to common memory 52 and attribute memory 53. At the same time, in common memory 52 and attribute memory 53, between the memory designated by the address data input from the external information processing apparatus 60 and the external information processing apparatus 60, the input and output of data is effected via data bus buffer 55.

In such a standard memory card structure, however, since the data stored in the memory card can be freely read out by a standard external information processing apparatus, there is no security for the data stored in the memory card.

SUMMARY OF THE INVENTION

The present invention has been developed to solve the above-described problem, and the main object of the present invention is to provide a security system for a standard memory card.

In order to achieve the aforementioned object, according to the present invention, there is provided a security system apparatus for a memory card employed in an information processing apparatus, comprising: an enciphering control data storing section provided in the memory card for storing coded control data from which a predetermined password can be obtained through decoding; a main memory section provided in the memory card for storing data from the information processing apparatus; a comparison password storing section provided in the memory card for storing the predetermined password as an uncoded reference password; a password comparison section provided in the memory card for comparing the reference password with the password input from the information processing apparatus; an access control section provided in the memory card for controlling access to the main memory section in accordance with the comparison result of the password comparison section; and a data decoding section provided in the information processing apparatus for decoding the coded control data, wherein the information processing apparatus outputs the password obtained by decoding the coded control data in the data decoding section to the password comparison section, and the access control section is arranged to prohibit access by the information processing apparatus to the main memory section when passwords fail to coincide.

Further according to the present invention, there is provided a security system apparatus for a memory card employed in an information processing apparatus, comprising in the memory card: an enciphering control data storing section for storing coded enciphering control data from which a pre-determined password can be obtained through decoding; a main memory section for storing data from the information processing apparatus; a comparison password storing section for storing the predetermined password as an uncoded reference password; a password comparison section for comparing the reference password with the password obtained through decoding the coded control data by the information processing apparatus; and an access control section for controlling access to the main memory section in accordance with the comparison result of the password comparison section, wherein the access control section prevents the information processing apparatus from accessing the main memory section when passwords fail to coincide.

On the other hand, in such a memory card and security system apparatus for a memory card, the access control section allows the information processing apparatus to access the main memory section where passwords coincide. More specifically, the access control section prohibits access to the main memory section by setting the main memory section to a stand-by state in which write-in or read-out is not possible, and releases the prohibition to access the main memory section by enabling the main memory section. Furthermore, the coding control data storing section is provided in an attribute memory storing attribute information of the memory card. In addition, the enciphering control data storing section and the comparison password storing section are provided in the attribute memory composed of RAM to make the pre-determined password renewable.

Further according to the present invention, there is provided a security system apparatus for a memory card employed in an information processing apparatus, comprising: an enciphering control data storing section provided in the memory card for storing coded enciphering control data wherein a pre-determined address data and a pre-determined password can be obtained through decoding; a main memory section provided in the memory card for storing data from the information processing apparatus; a comparison password storing section provided in the memory card for storing the predetermined password as an uncoded reference password; an address data comparison section provided in the memory card for comparing the comparison address data with the address data input from the information processing apparatus; a password comparison section provided in the memory card for comparing the reference password with the password input from the information processing apparatus; an access control section provided in the memory card for controlling access to the main memory section in accordance with the comparison result of the password comparison section; and a data decoding section provided in the information processing apparatus for decoding the coded enciphering control data, wherein the information processing apparatus outputs the address data obtained by decoding to the address data comparison section and outputs the password obtained by decoding to the password comparison section, and the access control section prohibits the information processing apparatus from accessing the main memory section when either the comparison result of the address data comparison section or the comparison result of the password comparison section indicates no coincidence.

Still further according to the present invention, there is provided in a memory card having a security system apparatus: an enciphering control data storing section for storing coded control data from which a pre-determined address data and a pre-determined password can be obtained through decoding; a main memory section for accommodating data from the information processing apparatus; a comparison address data storing section for storing the predetermined address data as uncoded reference address data; a comparison password storing section for storing the predetermined password as an uncoded reference password; an address data comparison section for comparing the comparison address data with the address data obtained by decoding the enciphering control data in the information processing apparatus; a password comparison section for comparing the reference password with the password obtained by decoding the enciphering control data in the information processing apparatus; and an access control section for controlling access to the main memory section, wherein the access control section prohibits the information processing apparatus from accessing the main memory section when either the comparison result of the address data comparison section or the comparison result of the password comparison section indicates no coincidence.

On the other hand, in such a security system apparatus for a memory card and a memory card, the access control section releases the prohibition on access by the information processing apparatus to the main memory section only when both address data coincide and both passwords coincide. More specifically, the access control section prohibits access to the main memory section by setting the main memory section to a stand-by state in which write-in and read-out is not possible, and releases the prohibition on access to the main memory section by enabling the main memory section. Furthermore, the enciphering control data storing section is provided in an attribute memory which stores attribute information of the memory card. In addition, the coding control data accommodating section, the comparison address data accommodating section, and the comparison password accommodating section are provided in an attribute memory composed of RAM. Thus, the pre-determined address data and pre-determined password are renewable.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

Hereinbelow, the present invention is described in detail based on the embodiment shown in the accompanying drawings.

EMBODIMENT 1

Figure 1:
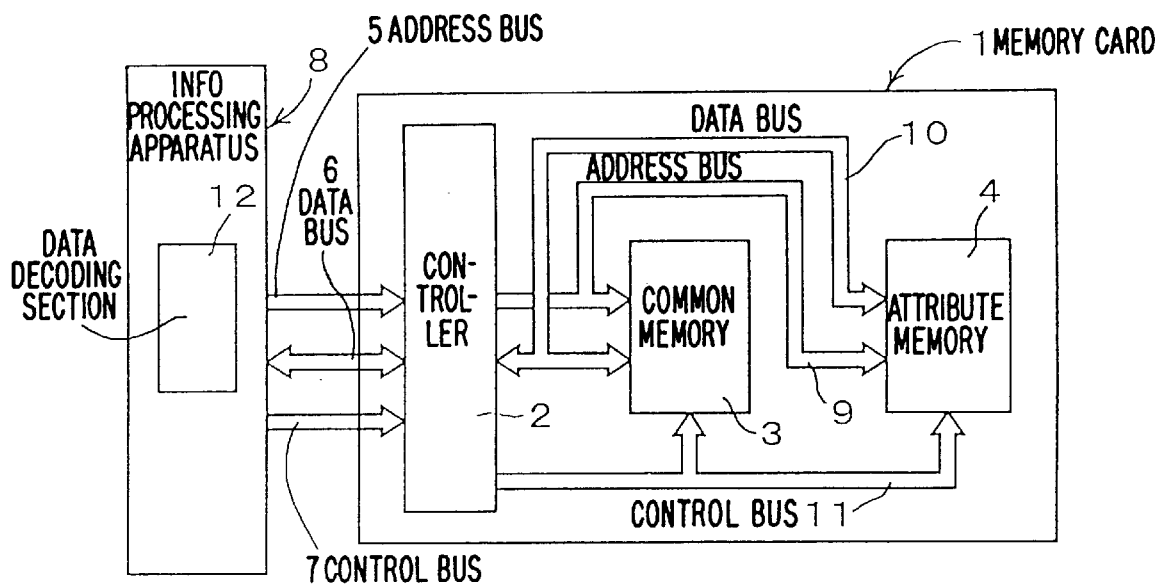
FIG. 1 is a schematic block diagram showing a security system apparatus for a memory card in embodiment type 1 of the present invention.

FIG. 1 is a schematic block diagram showing a security system apparatus for a memory card corresponding to embodiment 1 of the present invention. In FIG. 1, a memory card 1 is provided with a card controller 2 and an attribute memory 4. The card controller 2 is connected to an external information processing apparatus 8 with a bus composed of a data bus 6 and a control bus 7. Furthermore, card controller 2 is connected respectively to common memory 3 and attribute memory 4 with an internal address bus 9, internal data bus 10 and internal control bus 11. Furthermore, information processing apparatus 8 is provided with a data decoding section 12 for decoding coded data. It is noted that methods for coding and decoding data are well known, and since coding and decoding are performed by utilizing the error correction technique using well-known error correction symbols such as, for example, Reed-Solomon symbol and BCH symbol, the explanation thereof is omitted.

Figure 2:
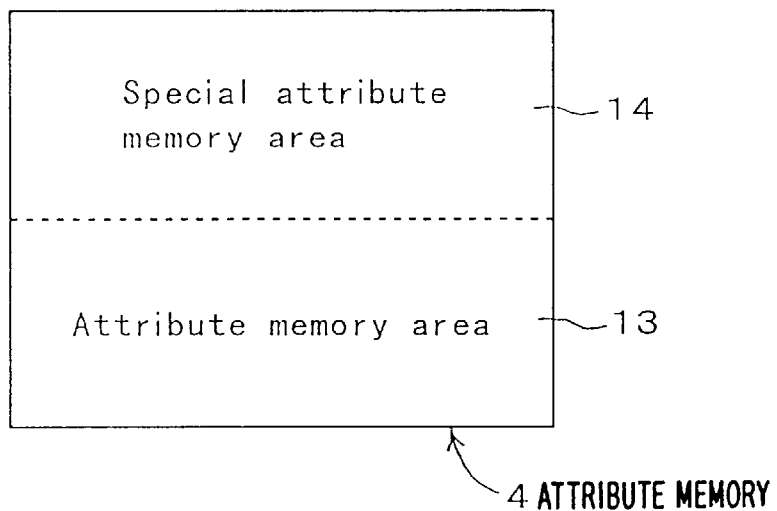
FIG. 2 is a diagram showing a configuration example of the memory area of the attribute memory 4 shown in FIG. 1.

Common memory 3 is nonvolatile RAM for storing the data input from the information processing apparatus 8, and attribute memory 4 is non-volatile RAM for storing data such as the card attribute information. FIG. 2 is a diagram showing an example configuration of the memory area of the attribute memory 4. As shown in FIG. 2, the attribute memory 4 is divided into an attribute memory area 13 which stores pre-determined card attribute information (CIS) and a special attribute memory area 14 which stores data used for security of the data within the memory card 1. In attribute memory area 13, the card attribute information similar to the standard conventional memory card is stored in special attribute memory area 14, the enciphering control data which is enciphered is stored, and enciphering control data is constituted so that password code having coded pre-determined password (hereafter, referred to as password code) can be obtained when decoded.

Figure 3:
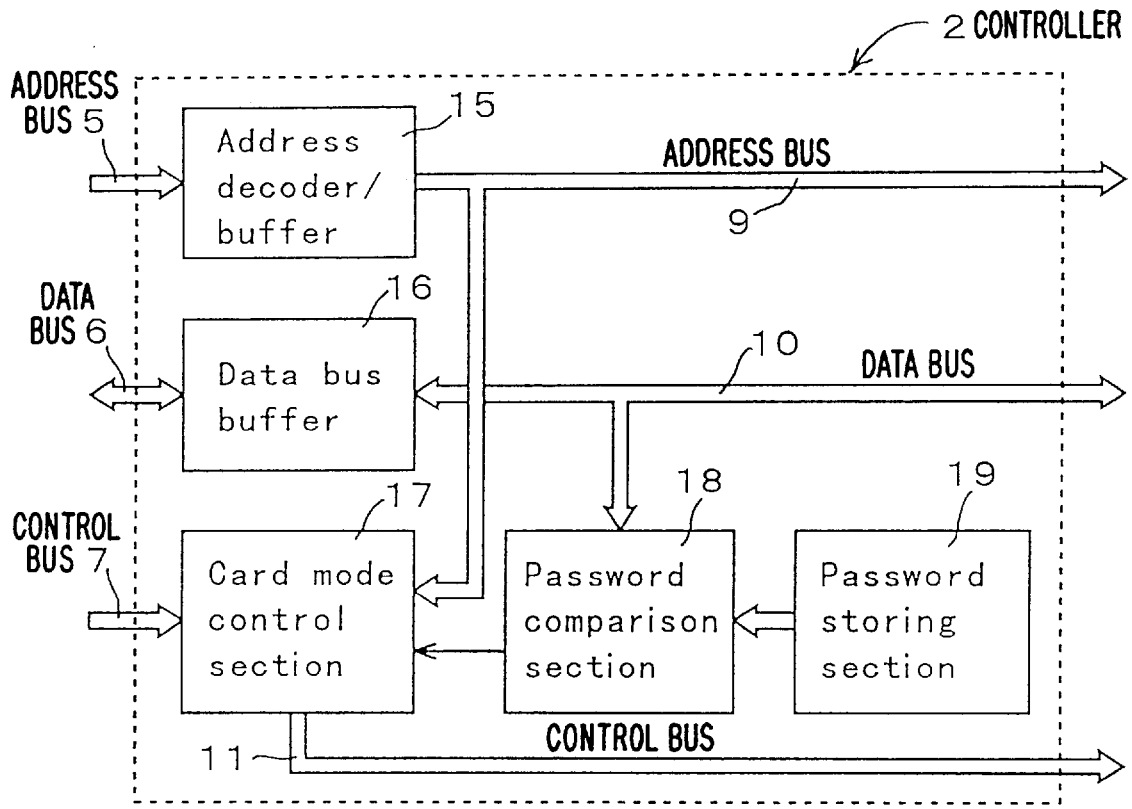
FIG. 3 is a schematic block diagram showing an example of the card controller 2 shown in FIG. 1.

FIG. 3 is a schematic block diagram showing an example of card controller 2. In FIG. 3, card controller 2 includes an address decoder/buffer 15 composed of an address buffer and an address decoder, a data bus buffer 16, a card mode control section 17, a password comparison section 18 and a password storing section 19 which is comprised of ROM in which the pre-determined, uncoded password is stored in advance as the reference password. Address decoder/buffer 15, data bus buffer 16 and card mode control section 17 are connected to information processing apparatus 8 with an address bus 5, a data bus 6 and a control bus 7, respectively.

Furthermore, address decoder/buffer 15 is connected to card mode control section 17, the common memory 3 and the attribute memory 4, respectively with internal address bus 9. The card mode control section 17 is connected to common memory 3 and attribute memory 4 with internal control bus 11, and is also connected to password comparison section 18. The data bus buffer 16 is connected to common memory 3, attribute memory 4, and password comparison section 18 with internal data bus 10. Password comparison section 18 is connected with the password storing section 19 with an internal bus having plural signal lines. It is noted that the common memory serves the main memory section, special attribute memory area serves the coding control data accommodating section, card mode control section 17 serves the access control section, and password storing section 19 serves the comparison password storing section.

In such a configuration described above, the address data output from the external information processing apparatus 8 via the address bus 5 is input to common memory 3 and attribute memory 4 via address decode/buffer 15 and the internal address bus 9, and is also input to the card mode control section 17. The card mode control section 17 outputs a chip select signal generated from the input address data, together with a write enable signal and an output enable signal input from the external information processing apparatus 8 through the control bus 7, to common memory 3 and attribute memory 4, respectively. At the same time, in common memory 3 and attribute memory 4, between the memory designated by the address data input from the external information processing apparatus 8 and external information processing apparatus 8, input and output of data is performed via data bus buffer 16.

By the data decoding section 12 of information processing apparatus 8, the data accommodated in special attribute memory area 14 is decoded, and the information processing apparatus 8 outputs and writes the obtained password code to password comparison section 18 via the data bus 6, data bus buffer 16, and card internal data bus 10. Password comparison section 18 compares the password input from the information processing apparatus 8 with the password code stored in the password storing section 19. When these passwords coincide, comparison section 18 outputs a password coincidence signal showing the coincidence of the password code with card mode control section 17. The card mode control section 17 is held in the stand-by state in which write-in or read-out of data is not possible until a password coincidence signal is input from the password comparison section 18. Upon input of a password coincidence signal from password comparison section 18, the stand-by state is released so as to enable access to the common memory 3.

When the stand-by state of the common memory 3 is released and put in the enabled state as described above, the address data output from the external information processing apparatus 8 is input to common memory 3 and attribute memory 4 via address decoder/buffer 15, and also input to the card mode control section 17. Card mode control section 17 outputs, together with the write enable signal and output enable signal input from the external information processing apparatus 8, the chip select signal generated from the input address data to common memory 3 and attribute memory 4, respectively.

At the same time, in common memory 3 and attribute memory 4, the address data output from the external information processing apparatus 8 is input via address decoder/buffer 15. Between the memory designated by address data and the external information processing apparatus 8, input and output of data is performed via data bus buffer 16. As described above, the security system apparatus of the first embodiment is constituted by the special attribute memory area 14 of attribute memory 4, the data decoding section 12, the card mode control section 17, the password comparison section 18, and the password storing section 19. It is to be noted that address bus 5, data bus 6, control bus 7, internal address bus 9, internal data bus 10, and internal control bus 11 respectively have plural signal lines.

Figure 4:
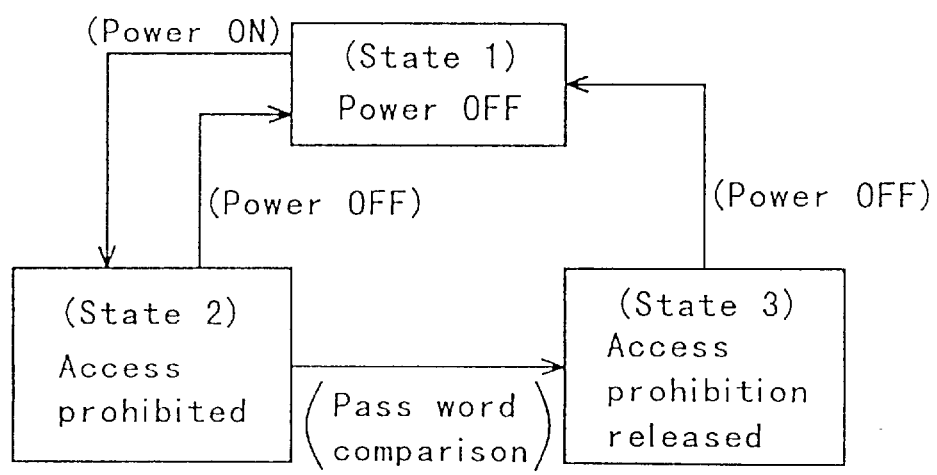
FIG. 4 is a chart showing a schematic security operation procedure example of a security system apparatus for a memory card in a first embodiment of the present invention.
Figure 5:
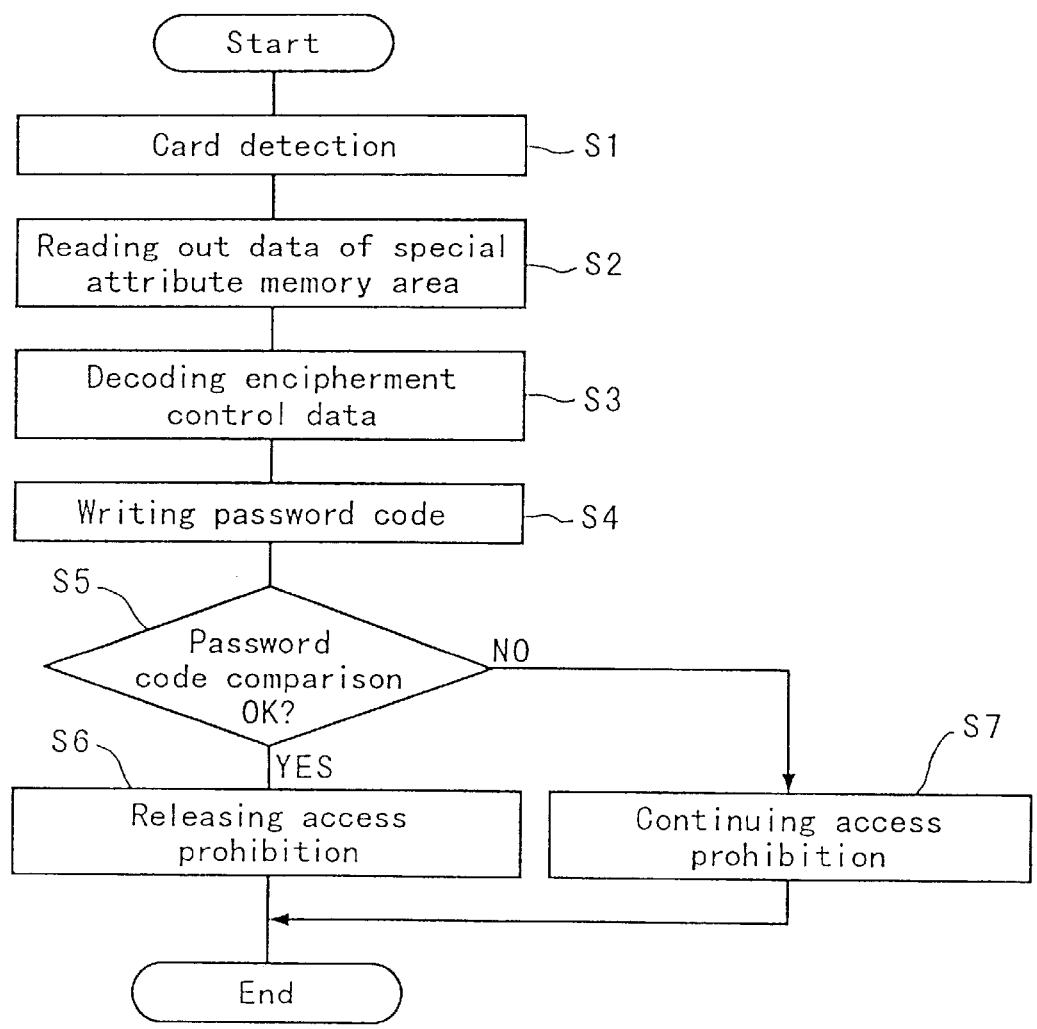
FIG. 5 is a flowchart showing a security operation example of a security system apparatus for a memory card in the first embodiment of the present invention.

FIG. 4 is a diagram showing a security operation example of the security system apparatus shown in FIGS. 1 to 3. FIG. 5 is a flowchart showing a security operation example of the security system apparatus shown in FIGS. 1 to 3 above. First, an operation example of the security system apparatus shown in FIGS. 1 to 3 above, is discussed with reference to FIG. 4.

In FIG. 4, when memory card 1 is inserted into the information processing apparatus 8 which has been switched on, or the information processing apparatus 8 is switched on when memory card 1 has already been inserted into the information processing apparatus 8, the information processing apparatus 8 detects the memory card 1 by reading out the card attribute information stored in the attribute memory area 13 of the attribute memory 4. Next, the memory card 1 changes from the state 1 (power off) to state 2 (access prohibition state) where access to the common memory 3 is prohibited. Next, the information processing apparatus 8 reads out the coding control data stored in the special attribute memory area 14 of the attribute memory 4 and outputs the password code obtained by decoding the coding control code in the data decoding section 12 to the password comparison section 18 via the data bus 6.

Password comparison section 18 reads out the reference password code from the password storing section 19 to check whether or not the password code input from the information processing apparatus 8 and the reference password code coincide with each other. In the case of coincidence, the password comparison section 18 outputs to the card mode control section 17 the password coincidence signal, and the card mode control section 17 releases the access prohibition state of common memory 3, and changes to state 3 (access prohibition release state) wherein access to the common memory 3 is possible. When the information processing apparatus 8 is switched off or the memory card 1 is pulled out from information processing apparatus 8 in state 2 or 3, state 1 is returned.

Next, the security operation of the security system apparatus shown in FIGS. 1 to 3 above is described in more detail using the flowchart shown in FIG. 5.

In FIG. 5, first at Step S1, when the memory card 1 is inserted into the operating information processing apparatus 8, or the information processing apparatus 8 with the memory card inserted therein is switched on, the information processing apparatus 8 accesses the attribute memory 4 of the memory card 1, reads out the card attribute information stored in the attribute memory area 13, and detects the memory card 1. Next at Step S2, the information processing apparatus 8 accesses the attribute memory 4 of the memory card 1, and reads out the coding control data stored in the special attribute memory area 14.

At Step S3, the data decoding section of the information processing apparatus 8 decodes the coding control data to obtain the password code. Next at Step S4, the information processing apparatus 8 outputs the password code obtained by decoding the coding control data to the password comparison section 18 via the data bus 6. At Step S5, the password comparison section 18 reads out the reference password code stored in the password storing section 19 for comparison with the password code input from the information processing apparatus 8. In the case of the coincidence, the process proceeds to Step S6.

At Step S6, the password comparison section 18 outputs the password coincidence signal to the card mode control section 17 to cause control section 17 to release the access prohibition state which prohibits access to the common memory 3, and terminates the security operation. Also, where the password codes do not coincide in Step 5 (NO), the process proceeds to Step S7. At Step S7, the password comparison section 18 does not output the password coincidence signal, and the card mode control section 17 terminates the security operation by maintaining the access prohibition state of the common memory 3.

As described above, the security system apparatus for the memory card in the first embodiment of the present invention is constituted so that the special attribute memory area 14 for storing the coding control data composed of a coded password and so on is provided in the vacant area of the conventionally used attribute memory. The attribute memory 4 is divided into a conventional attribute memory area 13 for accommodating the card attribute information and special attribute memory area 14. The pre-determined enciphering control data is stored in special attribute memory area 14. With this setup, a special attribute memory area 14 can be provided without requiring additional memory to accommodate the enciphering control data.

Furthermore, a password accommodating section 19 in which a pre-determined password code matching the password code included in the enciphering control data in the coded state is stored in advance as the reference password code is provided. The password code obtained by decoding the enciphering control data in the data decoding section 12 provided in the external information processing apparatus 8 is output by information processing apparatus 8 to password comparison section 18. Whether or not the password code stored in password storing section 19 and the password code decoded by information processing apparatus 8 coincide is checked by password comparison section 18. Since the access prohibition state in which access to the common memory 3 is not possible is not released by the card mode control section 17 in the case of non-coincidence, access by an information processing apparatus, not having a security system apparatus according to the first embodiment of the present invention, to card memory 1 having the security system apparatus of the first embodiment of the present invention becomes difficult. Thus, it is possible to hold the data in the memory card 1 in secrecy.

SECOND EMBODIMENT

While only coincidence of password codes is checked in the security system apparatus for a memory card in the above-described first embodiment, in order to further improve the effect of the security system apparatus, the enciphering control data may be arranged so that predetermined address data can be obtained in addition to the password code when decoded, and the password comparison section may be arranged so as not to perform the password code comparison when the pre-determined address data is not obtained. A security system apparatus for a memory card arranged in this way is referred to as the second embodiment of the present invention.

Figure 6:
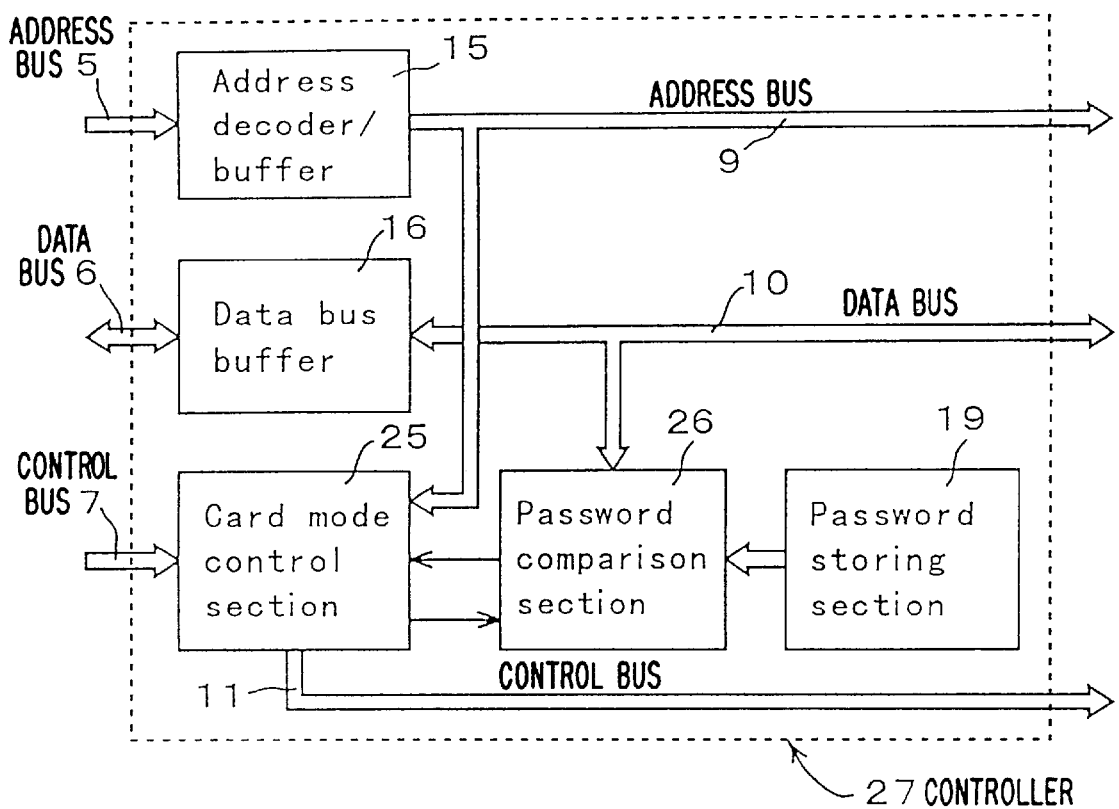
FIG. 6 is a schematic block diagram showing an example of a card controller of a security system apparatus for a memory card in a second embodiment of the present invention.

FIG. 6 is a schematic block diagram showing an example of the card controller of a security system apparatus for a memory card in the second embodiment of the present invention. It is noted that, since the schematic block diagram showing a security system apparatus for a memory card in the second embodiment has the same structure as that of FIG. 1, except for the internal configuration of the card controller 2, the diagram showing the configuration of the memory areas of the attribute memory is also the same as FIG. 2. Therefore, the explanation thereof is omitted below.

The difference between FIG. 6 and FIG. 3 is that, since the coding control data is arranged to provide a pre-determined password code and a pre-determined address data when decoded, the address data of the password code and address data obtained by decoding the enciphering control data in the data decoding section 12 of the information processing apparatus 8 is input to the card mode control section via the address bus 5. The card mode control section outputs an enable signal to the password comparison section in order to enable the password comparison section when the predetermined address data is input. The card mode control section 17 in FIG. 3 is changed to the card mode control section 25, the password comparison section 18 in FIG. 3 is changed to the password comparison section 26, and because of these changes, the card controller 2 is changed to the card controller 27.

The address data input from the external information processing apparatus 8 via the address bus 5 is input to common memory 3 and attribute memory 4 via address decoder/buffer 15 and card internal address bus 9, and is also input to the card mode control section 25. The card mode control section 25 outputs, together with a write enable signal and an output enable signal input from the external information processing apparatus 8 via the control bus 7, the chip select signal generated from the input address data to common memory 3 and attribute memory 4, respectively. At the same time, in common memory 3 and attribute memory 4, between the memory designated by the address data input from the external information processing apparatus 8 and external information processing apparatus 8, input and output of data is conducted via data bus buffer 16.

The coding control data stored in special attribute memory area 14 is decoded by the data decoding section 12 of information processing apparatus 8, information processing apparatus 8 obtains the password code and the address data, and the obtained password code is output to password comparison section 26 via the data bus 6. The obtained address data is output to card mode control section 25 via the address bus 5 to be written therein. In the card mode control section 25, the pre-determined address data is stored in advance as the reference address data, the card mode control section 25 outputs an enable signal to the password comparison section 26 only when the address data input from the information processing apparatus 8 agrees with the reference address data. The password comparison section 26 will not be enabled unless an enable signal is input from the card mode control section 25.

Because of this setup, unless the address data obtained through decoding the enciphering control data by the information processing apparatus 8 and the comparison address data stored in advance in the card mode control section 25 coincide with each other, the comparison of password codes in the password comparison section 26 will not be conducted, and the access prohibition state of the common memory 3 by the card mode control section 25 can not be released. On the other hand, when the address data input to the card mode control section 25 and reference address data coincide with each other, the card mode control section 25 outputs the enable signal to the password comparison section 26.

The password comparison section 26 input with the enable signal checks whether or not the password code input from the information processing apparatus 8 and the reference password code stored in the password storing section 19 coincide with each other. In the case of coincidence, password comparison section 26 outputs the password coincidence signal indicating coincidence of password codes to card mode control section 25. The card mode control section 25 holds common memory 3 in the access prohibition state in which access to common memory 3 is impossible until a password coincidence signal is input from the password comparison section 26. When a password coincidence signal is input from the password comparison section 26, the access prohibition state is released to make common memory 3 accessible.

When the access prohibition state of the common memory 3 is released in this way, the address data input from the external information processing apparatus 8 is input to common memory 3 and attribute memory 4 via address decoder/buffer 15, and is further input to the card mode control section 25. The card mode control section 25 outputs, together with the write enable signal and the output enable signal input from the external information processing apparatus 8, the chip select signal generated from the input address data to common memory 3 and attribute memory 4, respectively.

At the same time, in common memory 3 and attribute memory 4, the address data output from the external information processing apparatus 8 is input via address decoder/buffer 15. Furthermore, between the memory designated by the address data and the external information processing apparatus 8, input and output of data is conducted via data bus buffer 16. As described above, the security system apparatus in the second embodiment of the present invention is composed of attribute memory 4, data decoding section 12, card mode control section 25, password comparison section 26, and password storing section 19. It is noted that, in this embodiment, card mode control section 25 serves the comparison address data storing section, address data comparison section, and access control section. Furthermore, password comparison section 26 and password storing section 19 are connected with each other by the card internal bus having plural signal lines.

Subsequently, using the flowchart shown in FIG. 7, the security operation of the security system apparatus shown in FIG. 6 is described below. It is noted that in FIG. 7, the flow is the same as in said FIG. 5 except that the card mode control section 17 is changed to the card mode control section 25, the password comparison section 18 is changed to the password comparison section 26, and the card controller 2 is changed to the card controller 27. Thus, the same elements are designated with the same symbols, the explanation thereof is omitted, and only other differences from said FIG. 5 are described.

Figure 7:
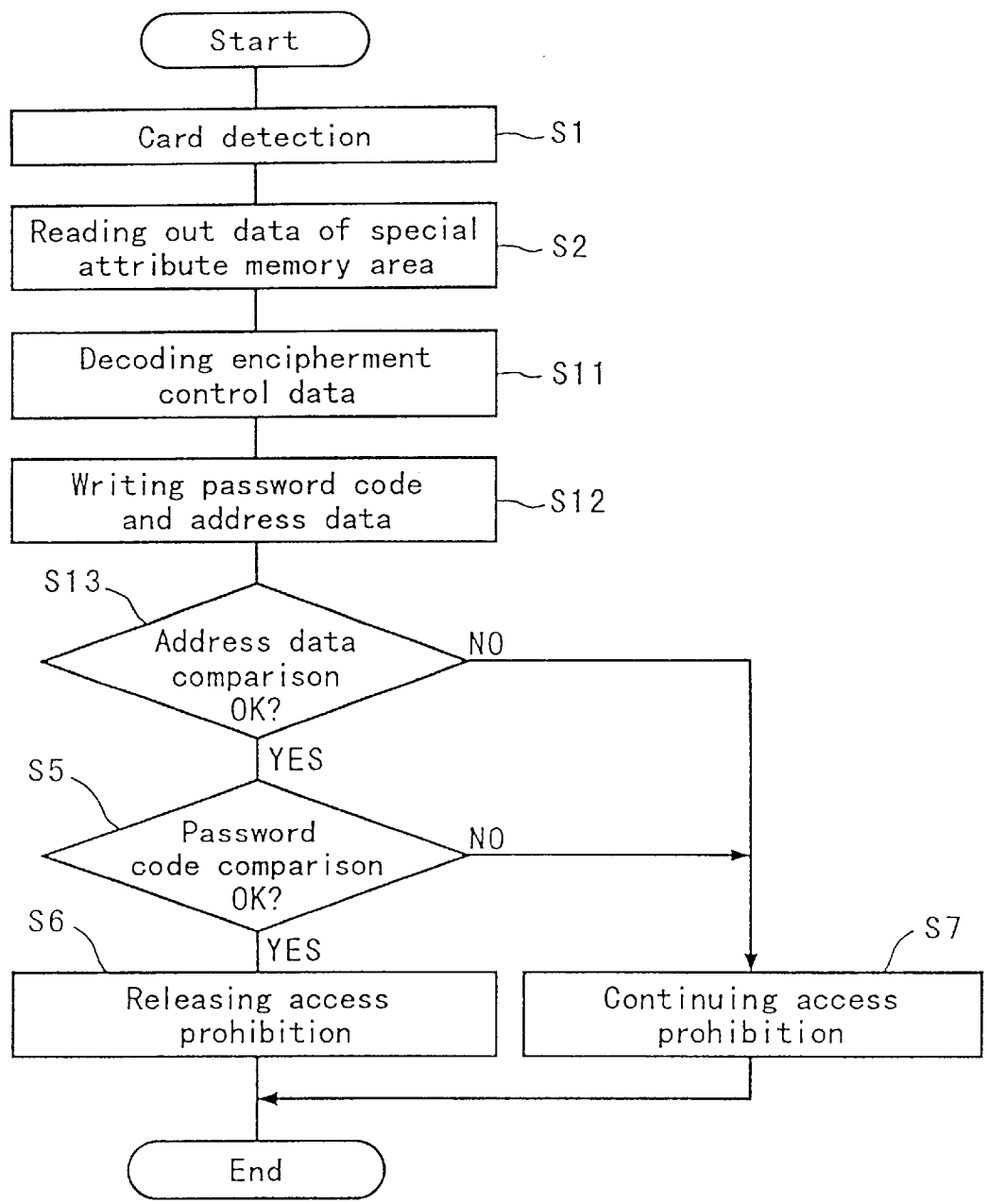
FIG. 7 is a flowchart showing a security operation example of a security system apparatus for a memory card in the second embodiment of the present invention.

The difference between FIG. 7 and FIG. 5 is that the processing of step S3 in FIG. 5 is replaced by the processing of step S11, the processing of step S4 in FIG. 5 is replaced by the processing of step S12, and the judgement processing of step S13 is added between step S3 and step S4 in FIG. 5.

In FIG. 7, after performing the processing of step S2 of FIG. 5, the process proceeds to step S11, and at step S11, the data decoding section 12 of the information processing apparatus 8 decodes the enciphering control data, and the information processing apparatus 8 obtains an address data and a password code. Next at step S12, the information processing apparatus 8 outputs the obtained password code to password comparison section 26 via the data bus 6 and outputs the obtained address data to the card mode control section 25 via the address bus 5. Next, the process proceeds to step S13, whereat the card mode control section 25 compares the input and written address data with the reference address data stored in advance, and in the case of the coincidence (YES), the processing following step S5 in FIG. 5 is performed. In the case where the input and written address data does not coincide with the reference address data (NO), the processing following step S7 of FIG. 5 is conducted.

As described above, the security system apparatus for a memory card in the second embodiment is arranged to constitute the enciphering control data so that, in addition to the effect realized by the security system apparatus of the first embodiment, password code and address data can be obtained when decoded. In the card mode control section 25, a predetermined address code is stored in advance as the reference address data and the card mode control section 25 will not enable password comparison section 26 unless the address data input from the information processing apparatus 8 and the reference address data coincide with each other. Therefore, since the access prohibition state to the common memory 3 is released only when passwords coincide, access by the information processing apparatus, having no security system apparatus according to the second embodiment, to said memory card 1 having a security system apparatus according to the second embodiment becomes further difficult. Thus, it is possible to hold the data in the memory card in secrecy.

THIRD EMBODIMENT

While it was impossible to change the password in the security system apparatus for a memory card according to the first or second embodiment of the present invention, because the comparison password code was stored in advance in the password storing section in order to further raise the security effect of the security system apparatus, the security system apparatus may be arranged to store the comparison password code in the attribute memory instead of having the password code stored in advance in the password accommodating section. This way, the comparison password code may be changed, and the security system apparatus for a memory card which is so arranged is referred to as the third embodiment of the present invention.

The security system apparatus for a memory card in the third embodiment has the same configuration as in FIG. 1 except for the internal configuration of the card controller 2.

Figure 8:
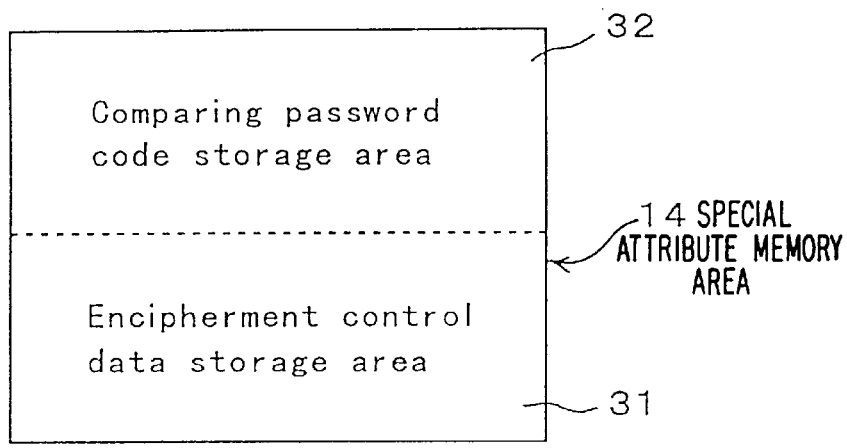
FIG. 8 is a diagram showing a configuration example of a special attribute memory area of a security system apparatus for a memory card in a third embodiment of the present invention.

FIG. 8 is a diagram showing the configuration example of the special attribute memory area in the memory card constituting a security system apparatus according to the third embodiment. It is to be noted that same components as in said FIG. 2 are designated with the same symbols. As shown in FIG. 8, the special attribute memory area 14 is composed of a coding control data storing area 31 wherein enciphering control data, which is enciphered data, is stored and a comparison password code storing area 32 which stores uncoded reference password code. The coding control data stored in the coding control data storing area 31 is constituted so that a password code indicating password and address data can be obtained when decoded.

Figure 9:
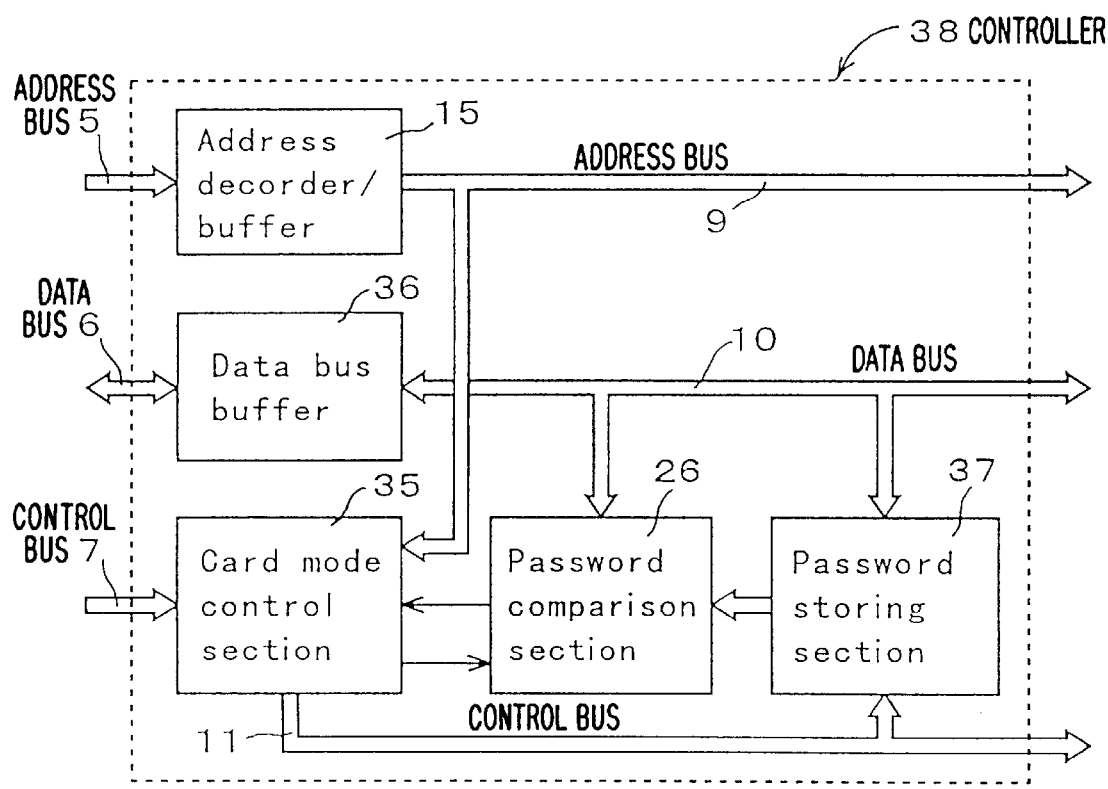
FIG. 9 is a schematic block diagram showing an example of a card controller in a security system apparatus for a memory card in the third embodiment of the present invention.

FIG. 9 is a schematic block diagram, showing an example of the card controller of the security system apparatus in the third embodiment. It is noted that the same components as in FIGS. 3 and 6 are designated with same symbols, the explanation thereof is omitted, and only the differences from said FIG. 6 are described.

The difference between FIG. 9 and FIG. 6 lies in that the information processing apparatus 8 obtains the password code and address data by decoding the enciphering control data in data decoding section 12, and accesses the attribute memory 4 to write the comparison password code in the comparison password code storing area into the password storing section constituted by RAM. In this case, the card mode control section outputs a locking signal which prohibits output of data to the data bus buffer so that the comparison password code is not output to the side of the information processing apparatus 8. Because of this setup, the card mode control section 25 in FIG. 6 is changed to the card mode control section 35, the password storing section 19 in FIG. 6 is changed to the password storing section 37, and because of these changes, the card controller 27 is changed to the card controller 38.

The address data input from the external information processing apparatus 8 via the address bus 5 is input to common memory 3 and attribute memory 4 via address decoder/buffer 15 and card internal address bus 9, and also is input to the card mode control section 35. The card mode control section 35 outputs, together with the write enable signal and output enable signal input from the external information processing apparatus 8 via the control bus 7, the chip select signal generated from the input address data to common memory 3 and attribute memory 4, respectively. At the same time, in common memory 3 and attribute memory 4, between the memory designated by the address data input from the external information processing apparatus 8 and external information processing apparatus 8, input and output of data is conducted via data bus buffer 36.

The coding control data stored in the coding control data storing area 31 of special attribute memory area 14 is decoded by the data decoding section 12 of information processing apparatus 8, and information processing apparatus 8 obtains the password code and address data. Next, the information processing apparatus 8 outputs the address data for reading and accessing the comparison password code storing area 32 of special attribute memory area 14 to the attribute memory 4 and the card mode control section 35 via the address bus 5. The card mode control section 35 outputs, when the address data is input, to the data bus buffer 36 a locking signal which prohibits the output of data until a different address data is input therein. In this state, the information processing apparatus 8 reads out the comparison password code from the comparison password code storing area 32 and writes the same to the password storing section 37 composed of RAM.

Because of this setup, the comparison password code stored in comparison password storing area 32 can be stored in the password storing section 37 without being output to the information processing apparatus 8. Furthermore, the information processing apparatus 8 outputs the address data obtained by decoding the enciphering control data to password comparison section 26 via the data bus 6 to write the same therein, and outputs the address data obtained by decoding to the card mode control section 35 to write the same therein, and the card mode control section 35 releases the locking signal to the data bus buffer 36.

In the card mode control section 35, pre-determined uncoded address data is stored in advance as the reference address data. The card mode control section 35 outputs an enable signal to the password comparison section 26 only when the address data input from the information processing apparatus 8 coincides with the reference address data. The password comparison section 26 will not be enabled unless an enable signal is input from the card mode control section 35. Because of this setup, unless the address data obtained through decoding the coding control data by the information processing apparatus 8 and the reference address data stored in the card mode control section 35 agree with each other, the comparison of password codes in the password comparison section 26 will not be conducted, and the access prohibition state to the common memory 3 effected by the card mode control section 25 can not be released.

On the other hand, when the address data input to the card mode control section 35 and the comparison address data coincide with each other, the card mode control section 35 outputs the enable signal to the password comparison section 26. The password comparison section 26 input with the enable signal checks whether or not the password code input from the information processing apparatus 8 and the reference password code stored in the password storing section 37 coincide with each other, and in the case of the coincidence, outputs the password coincidence signal indicating the coincidence of password codes to card mode control section 35. The card mode control section 35 holds common memory 3 in the access prohibition state in which access to common memory 3 is impossible until a password coincidence signal is input from the password comparison section 26, and when a password coincidence signal is input from the password comparison section 26, the access prohibition state is released to make common memory 3 accessible.

When the access prohibition state to the common memory 3 is released in this way, the address data input from the external information processing apparatus 8 is input to common memory 3 and attribute memory 4 via address decoder/buffer 15, and is further input to the card mode control section 35. The card mode control section 35 outputs, together with the write enable signal and the output enable signal input from the external information processing apparatus 8, the chip select signal generated from the input address data to common memory 3 and attribute memory 4, respectively.

At the same time, in common memory 3 and attribute memory 4, the address data output from the external information processing apparatus 8 is input via address decoder/buffer 15. Furthermore, between the memory designated by the address data and the external information processing apparatus 8, input and output of data is conducted via data bus buffer 16. As described above, the security system apparatus according to the third embodiment is composed of attribute memory 4, data decoding section 12, card mode control section 35, password comparison section 26 and password storing section 37.

It is noted that in the third embodiment, coding control data storing area 31 serves the coding control data storing section, comparison password code storing area 32 serves the comparison password storing section, password comparison section 26 and password storing section 37 serve the password comparison section, and card mode control section 35 serves the comparison address data storing section, the address data comparison section and the access control section. Furthermore, password comparison section 26 and password storing section 37 are connected with each other with the card internal bus composed of plural signal lines.

Subsequently, using the flowchart shown in FIG. 10, the security operation of the security system apparatus shown in FIGS. 8 and 9 is described below. It is noted that in FIG. 10, the flow is the same as in said FIG. 5 except that the card mode control section 17 is changed to the card mode control section 35, the data bus buffer 16 is changed to the data bus buffer 36, the password storing section 19 is changed to the password storing section 37, and along with these change, the card controller 2 is changed to the card controller 38, is designated with the same symbol, the explanation thereof is omitted and only other differences from FIG. 5 are described.

Figure 10:
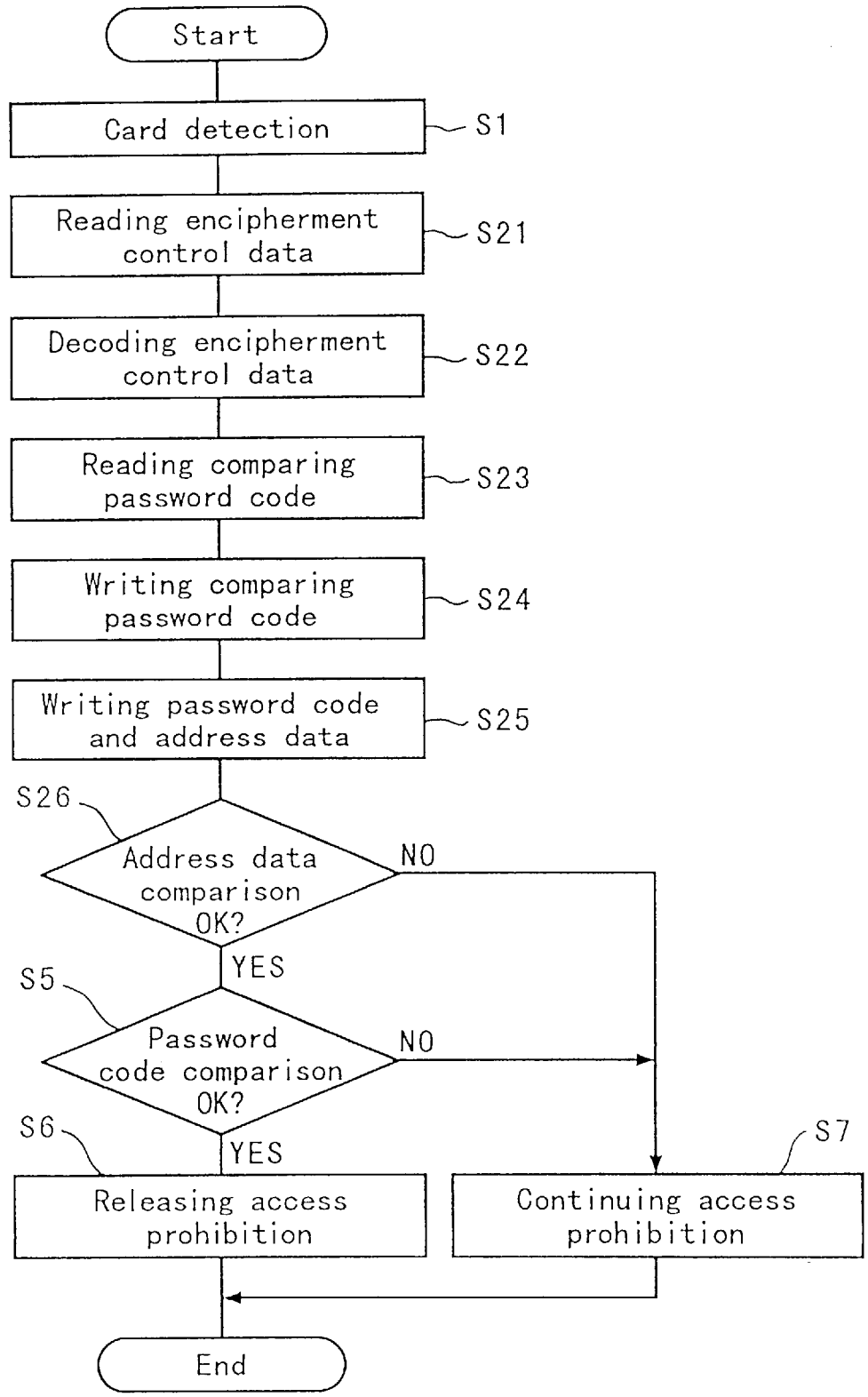
FIG. 10 is a flowchart showing a security operation example of a security system apparatus for a memory card in the third embodiment of the present invention.

The difference between FIG. 10 and FIG. 5 lies in that the processing from step S2 to step S4 in FIG. 5 is replaced by the processing of step S11, the processing of step S4 in FIG. 5 is replaced by the processing from step S21 to step S24.

In FIG. 10, after performing the process of step S1 in FIG. 5, the process proceeds to step S21. At step S21, the information processing apparatus 8 accesses the attribute memory 4 and reads out the coding control data stored in the coding control data storing area of the special attribute memory area 14. Next at step S22, the data decoding section 12 of the information processing apparatus 8 decodes the coding control data to obtain address data and password code, and the process proceeds to step S23. At step S23, the information processing apparatus 8 accesses the attribute memory 4 to read out the comparison password code stored in the comparison password code storing area 32 of the special attribute memory area 14. In this case, the card mode control section 35 outputs a locking signal which prohibits the output of data to the data bus buffer 36 to prevent the comparison password code from being output to the information processing apparatus 8.

After writing and storing the comparison password code in the password code storing section 37 at step S24, the information processing apparatus 8 outputs, at step S25, the password code obtained by decoding the enciphering control data to password comparison section 26 via the data bus 6 and the obtained address data to the card mode control section 35 via the address bus 5. At this time, the locking signal of the card mode control section 35 to the data bus buffer 36 is released. Next, at step S26, the card mode control section 35 compares the address data input and written therein with the reference address data stored in advance, and in the case of coincidence (YES), the processing following step S5 in FIG. 5 is conducted. In the case where the address data input and written fails to coincide with the comparison address data (NO), the processing following step S7 in FIG. 5 is conducted.

As described above, since the security system apparatus for a memory card in the third embodiment is constituted so that, in addition to the same effects of the security system apparatus for a card memory in the first or second embodiment of the present invention, the special attribute memory area 14 of the attribute memory is divided into an area 31 storing the enciphering control data and an area 32 storing the comparison password code. When comparing password codes so that the comparison password code stored in the reference password code storing area 32 is stored in the password storing section 37, it becomes possible to change the comparison password code beforehand. As a result of this setup, access by the information processing apparatus, having no security system apparatus according to the third embodiment, to memory card 1 having a security system apparatus according to the third embodiment becomes further difficult, making it possible to hold the data in the memory card 1 in secrecy.

FOURTH EMBODIMENT

While it was made possible to change only the password code in the security system apparatus for a memory card in the third embodiment, in order to further raise the security effect of the security system apparatus, the security system apparatus may be arranged to store the comparison address data in the attribute memory 4 instead of the comparison address data stored in advance in the card mode control section 35 so that the comparison address data can be changed in addition to the comparison password code. The security system apparatus for a memory card which is so arranged is referred to as the fourth embodiment of the present invention.

The security system apparatus for a memory card in the fourth embodiment has the same configuration as in FIG. 1 except for the internal configuration of the card controller 2.

Figure 11:
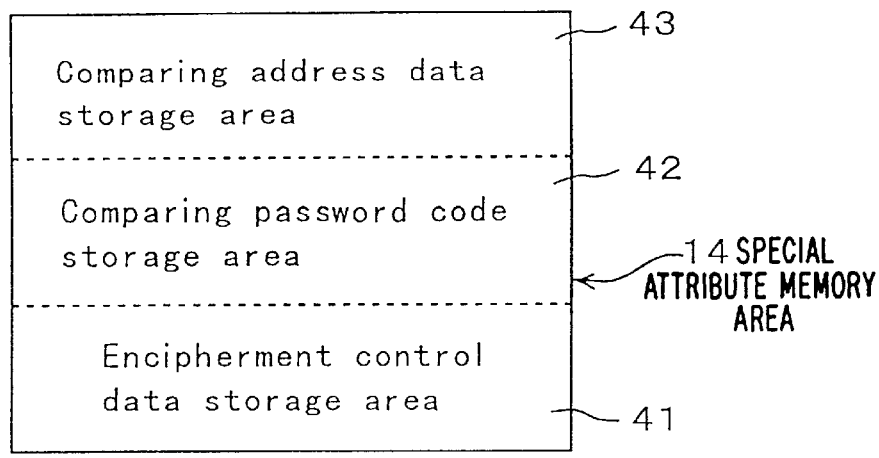
FIG. 11 is a diagram showing a configuration example of a special attribute memory area of a security system apparatus for a memory card in a fourth embodiment of the present invention.

FIG. 11 is a diagram showing a configuration example of the special attribute memory area in the memory card constituting a security system apparatus in the fourth embodiment. It is to be noted that in FIG. 11, the same components as in said FIG. 2 are designated with the same symbols. As shown in FIG. 11, the special attribute memory area 14 is composed of an enciphering control data storing area 41, wherein enciphering control data, which is enciphered data, is stored and a comparison password code storing area 42 which stores the uncoded reference password code, and further a comparison address data accommodating area 43 which stores uncoded reference address data. The coding control data stored in coding control data storing area 41 is constituted so that a password code and address data can be obtained when decoded.

Figure 12:
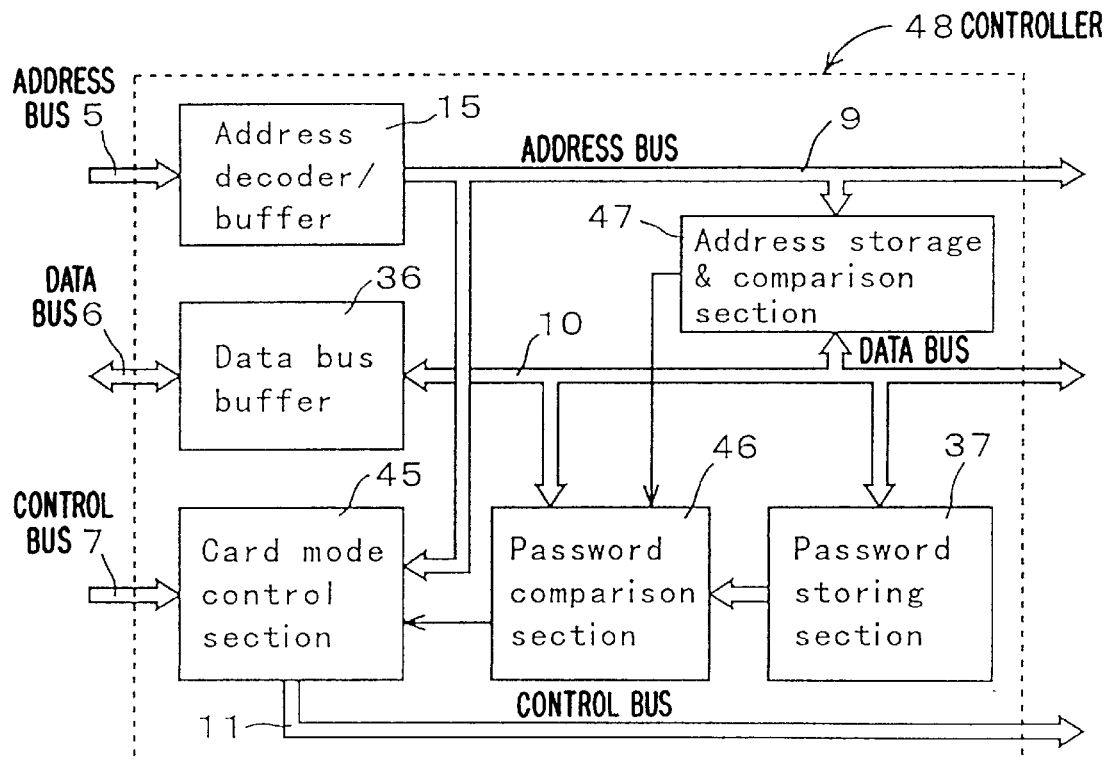
FIG. 12 is a schematic block diagram showing an example of a card controller in a security system apparatus for a memory card in the fourth embodiment of the present invention.

FIG. 12 is a schematic block diagram showing an example of the card controller of the security system apparatus according to the fourth embodiment. It is noted that in FIG. 11, the same components as in FIGS. 3, 6 and 9 are designated with the same symbols, and the explanation thereof is omitted so that only the differences from said FIG. 9 are described.

The difference between FIG. 12 and FIG. 9 lies in that, in addition to the arrangement that the address data comparison is conducted, not by the card mode control section, but instead by a newly provided address storing and comparison section 47, the information processing apparatus 8 obtains the password code and address data by decoding the coding control data in its data decoding section 12, and accesses the attribute memory 4 to write the comparison password code in the comparison password code storing area into the password storing section constituted by RAM, and the comparison address data in the comparison address data storing area 43 into comparison address data storing and comparison section 47 provided with RAM.

In this case, the card mode control section outputs a locking signal which prohibits output of data to the data bus buffer so that the comparison password code and comparison address data are not output to the side of the information processing apparatus 8. Because of this setup, the card mode control section 35 in FIG. 9 is changed to the card mode control section 45, the password comparison section 26 in FIG. 9 is changed to the password comparison section 37 and, because of these changes, the card controller 38 is changed to the card controller 48.

Address storing and comparison section 47 is connected to the card internal address bus 9 and the card internal data bus 10, and further to the password comparison section 46. In addition, password comparison section 46 and password storing section 37 are connected to each other with an internal bus composed of plural signal lines.

The address data input from the external information processing apparatus 8 via the address bus 5 is input to common memory 3 and attribute memory 4 via address decoder/buffer 15 and card internal address bus 9, and also input to the card mode control section 45. The card mode control section 45 outputs, together with the write enable signal and output enable signal input from the external information processing apparatus 8 via the control bus 7, the chip select signal generated from the input address data to common memory 3 and attribute memory 4, respectively. At the same time, in common memory 3 and attribute memory 4, between the memory designated by the address data input from the external information processing apparatus 8 and external information processing apparatus 8, input and output of data is conducted via data bus buffer 36.

The coding control data stored in the coding control data storing area 41 of special attribute memory area 14 is decoded by the data decoding section 12 of information processing apparatus 8. Information processing apparatus 8 obtains the password code and address data. Next, the information processing apparatus 8 outputs the address data for accessing the comparison password code storing area 32 of special attribute memory area 14 to the attribute memory 4 and the card mode control section 45 via the address bus 5. The card mode control section 45 outputs, when the address data is input, to the data bus buffer 36 a locking signal which prohibits the output of data until a different address is input therein. In this state, the information processing apparatus 8 reads out the comparison password code from the comparison password code storing area 43 and writes the same to the password storing and comparison section 47.

Because of this setup, the reference password code stored in comparison password storing area 42 and the reference address data stored in comparison address data storing area 43 can be stored in the password storing section 37 and address storing and comparison section 47 without being output to the information processing apparatus 8. Furthermore, the information processing apparatus 8 outputs the password code obtained by decoding the enciphering control data to password comparison section .26 via the data bus 6 to write the same therein and outputs the address data obtained by decoding to the card mode control section 45 to write the same therein, and the card mode control section 45 releases the locking signal to said data bus buffer 36. In this manner, the card mode control section 45 outputs the locking signal to the data bus buffer 36 when the address data indicating the comparison password code storing area 42 and the address data indicating the comparison address data storing area 43 are input.

In address storing and comparison section 47, the comparison address data is stored in advance, and the address storing and comparison section 47 outputs an enabling signal to the password comparison section 46 only when the address data input from the information processing apparatus 8 coincides with the reference address data. The password comparison section 46 will not be enabled unless an enable signal is input from the address storing and comparison section 47. Because of this setup, unless the address data obtained through decoding the coding control data by the information processing apparatus 8 and the comparison address data coincide with each other, the comparison of password codes in the password comparison section 46 will not be conducted, and the access prohibition state to the common memory 3 caused by the card mode control section 45 cannot be released.

On the other hand, when the address data input to the address accommodation and comparison section 47 and the comparison address data coincide with each other, the address storing and comparison section 47 outputs the enable signal to the password comparison section 46. The password comparison section 46 input with the enable signal checks whether or not the password code input from the information processing apparatus 8 and written therein and the reference password code stored in the password storing section 37 coincide with each other, and in the case of coincidence, outputs the password coincidence signal indicating the coincidence of password codes to card mode control section 45. The card mode control section 45 holds common memory 3 in the access prohibition state wherein the access to common memory 3 is impossible until password agreement signal is input from the password comparison section 46, and when a password coincidence signal is input from the password comparison section 46, the access prohibition state is released to make common memory 3 accessible.

When the access prohibition state to the common memory 3 is released in this way, the address data input from the external information processing apparatus 8 is input to common memory 3 and attribute memory 4 via address decoder/buffer 15, and further input to the card mode control section 45. The card mode control section 45 outputs, together with the write enable signal and the output enable signal input from the external information processing apparatus 8, the chip select signal generated from the input address data to common memory 3 and attribute memory 4, respectively.

At the same time, in common memory 3 and attribute memory 4, the address data output from the external information processing apparatus 8 is input via address decoder/ buffer 15 and furthermore, between the memory designated by the address data and the external information processing apparatus 8, input and output of data is conducted via data bus buffer 36. As described above, the security system apparatus according to the fourth embodiment is composed of attribute memory 4, data decoding section 12, data bus buffer 36, password storing section 37, card mode control section 45, password comparison section 46, and address storing and comparison section 47.

It is noted that in the fourth embodiment, coding control data storing area 41 serves the coding control data storing section, comparison password code storing area 42 serves the comparison password storing section, comparison address data storing area 43 serves the comparison address data storing section, card mode control section 45 serves the access control section, password comparison section 46 and password storing section 37 serve the password comparison section, and address storing and comparison section serves the address data comparison section.

Using the flowchart shown in FIG. 13, the security operation of the security system apparatus shown in said FIGS. 11 and 12 is described below. It is noted that in FIG. 13, the flow is the same as in FIG. 10 except that the card mode control section 35 is changed to the card mode control section 45, the password comparison section 26 is changed to the password comparison section 46. Along with these changes, the card controller 38 is changed to the card controller 48. Only other differences from FIG. 10 are thus described.

Figure 13:
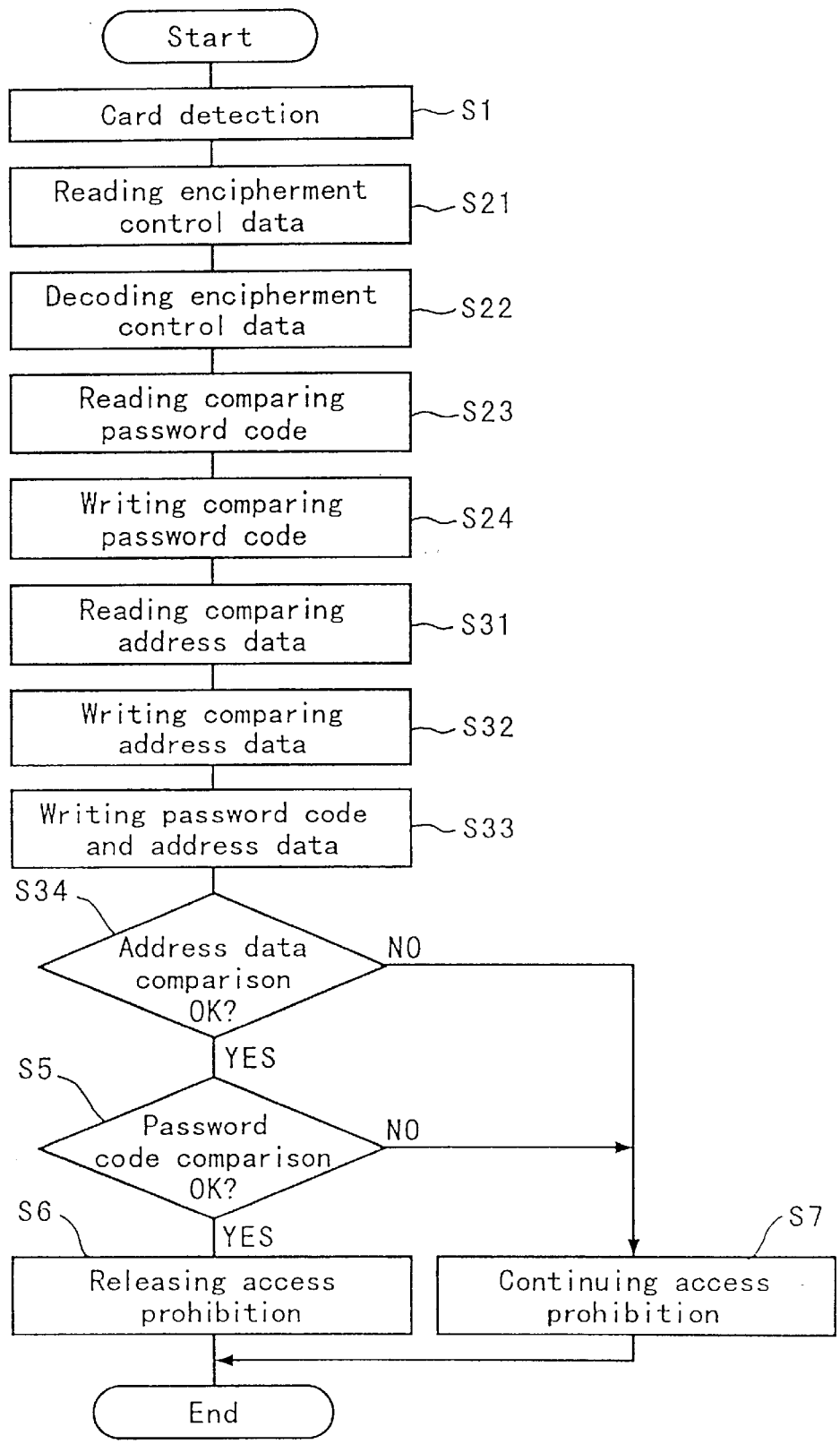
FIG. 13 is a flowchart showing a security operation example of a security system apparatus for a memory card in the fourth embodiment of the present invention.
Figure 14:
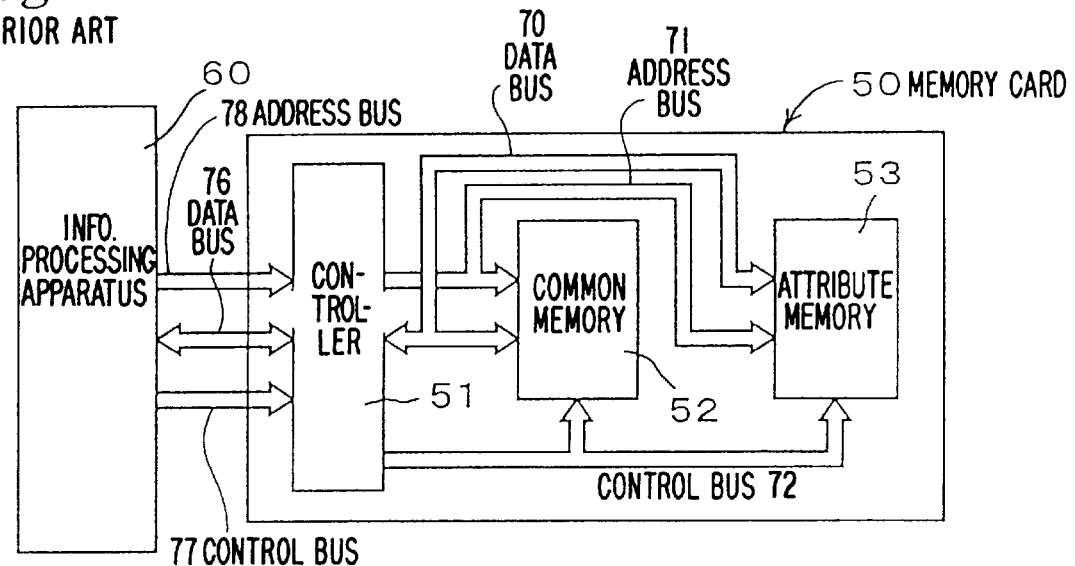
FIG. 14 is a schematic block diagram showing an example of a conventional memory card.
Figure 15:
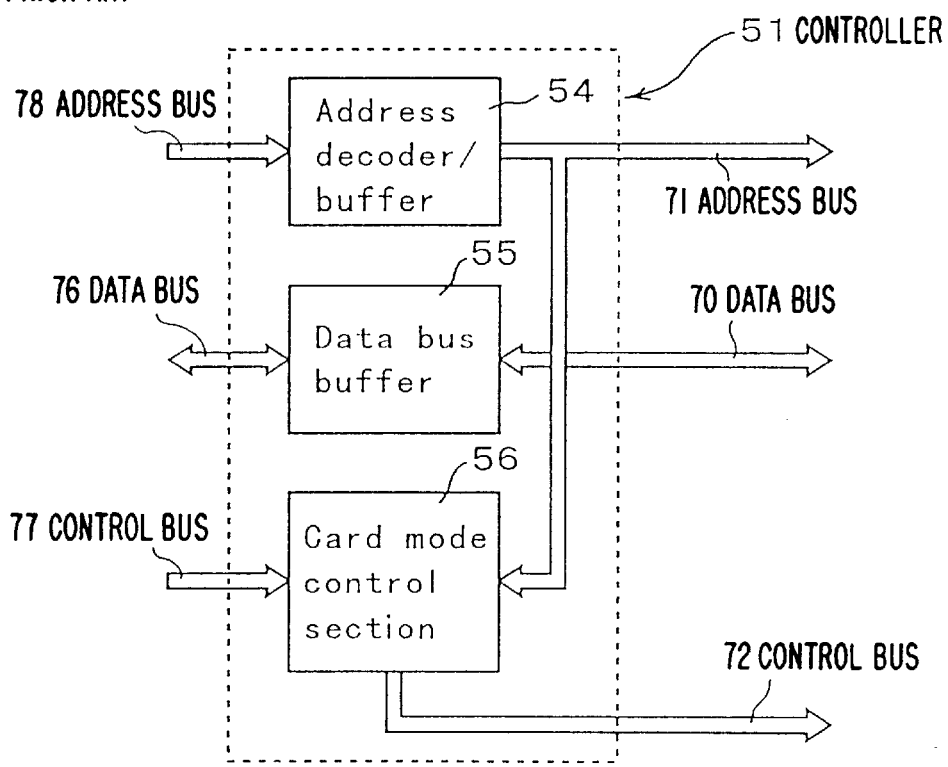
FIG. 15 is a schematic block diagram showing the card controller 51 shown in FIG. 14.

The differences between FIG. 13 and FIG. 10 lie in that the processing of step S25 in FIG. 10 is replaced by the processing from step S31 to step S33, and the processing of step S26 in FIG. 10 is replaced by the processing of S33 for conducting judgement.

In FIG. 13, after performing the processing of step S24 in FIG. 10, the process proceeds to step S31. At step S31, the information processing apparatus 8 accesses the attribute memory 4 and reads out the reference address data stored in the comparison address data storing area 43 of the special attribute memory area 14. In this case, the card mode control section 45 outputs a locking signal which prohibits the output of data to the data bus buffer 36 to prevent the reference address data from being output to the information processing apparatus 8.

After storing the reference address data in the address storing and comparison section 47 at step S32, the information processing apparatus 8 outputs, at step S33, the password code obtained by decoding the enciphering control data to password comparison section 46 via the data bus 6 and the obtained address data to the card mode control section 45 via the address bus 5. At this time, the locking signal of the card mode control section 45 to the data bus buffer 36 is released. Next, the process proceeds to step S34. At step S34, the address storing and comparison section 47 compares the address data input therein with the reference address data stored in advance, and in the case of coincidence (YES), the processing following step S5 in FIG. 5 is conducted. In the case where the input address data fails to coincide with the comparison address data (NO), the processing following step S7 in said FIG. 5 is conducted.

As described above, since the security system apparatus for a memory card in the fourth embodiment is constituted so that, in addition to the effects of the security system apparatus for a card memory in the first, second or third embodiment of the present invention, the special attribute memory area 14 of the attribute memory 4 is divided into an area 41 which stores the enciphering control data, an area 42 which stores the comparison password code, and an area 43 which stores the comparison address data. When comparing address data, the reference address data stored in the comparison address data storing area 43 is stored in the address storing and comparison section 47, it becomes possible to change the reference address data in addition to the reference password code beforehand. As a result of this setup, access by an information processing apparatus, without a security system apparatus according to the fourth embodiment, to said memory card 1 having a security system apparatus according to the fourth embodiment becomes more difficult, making it possible to hold the data in the memory card 1 in secrecy more securely.

As is clear from the foregoing description, according to the security system apparatus for a memory card of the present invention, the comparison password storing section wherein the same pre-determined password as the pre-determined password included in the enciphering control data in the coded state is stored in advance as the uncoded reference password, is provided. The external information processing apparatus outputs the pre-determined password obtained through decoding the enciphering control data by the data decoding section to the password comparison section, and by the password comparison section, whether or not the reference password stored in comparison password storing section and the password decoded by the information processing apparatus coincide with each other is checked.

In the case where passwords do not agree with each other, access to the main memory section by the information processing apparatus is prohibited by the access control section. On the other hand, when passwords coincide with each other, since the main memory section is put in the enable state by the access control section, the prohibition of access to the main memory section by the information processing apparatus is released. From this setup, access to a memory card having the security system apparatus of the present invention by the information processing apparatus which has no security system apparatus of the present invention, becomes difficult. Thus, the secrecy of the data in the memory card can be secured. Furthermore, because the enciphering control data storing section is provided in attribute memory to accommodate the enciphering control data in the vacant space in the conventionally used attribute memory, additional expense can be avoided.

Furthermore in the security system apparatus for a memory card and the memory card therefor according to the present invention, the enciphering control data is constituted so that a pre-determined password code and pre-determined address data can be obtained when decoded, and the comparison address data storing section which stores the predetermined uncoded address data as the reference address data and the comparison password storing section which stores the predetermined uncoded password reference are provided. The information processing apparatus outputs the address data obtained by decoding in the data decoding section to the address data comparison section and the password obtained by decoding similarly to the password comparison section. By the address data comparison section, whether or not the reference address data stored in the address data storing section and the address data decoded by the information processing apparatus coincide with each other is checked and by the password comparison section, whether or not the reference password stored in the password storing section and the password decoded by the information processing apparatus coincide with each other is checked.

In the case where any of the address data and the passwords fail to coincide, access to the main memory section by the information processing apparatus is prohibited by placing the main memory section into the stand-by state by the access control section. On the other hand, when the address data and passwords coincide, since the main memory section is enabled by the access control section, the prohibition of access to the main memory section by the information processing apparatus is released. As described above, since the information processing apparatus can not access the main memory unless the address data and passwords coincide, respectively, access by an information processing apparatus, not having the security system apparatus of the present invention, to the memory card with the security system apparatus introduced therein becomes more difficult, making it possible to hold the data of the memory card in secrecy.

Furthermore, since the enciphering control data storing section and the comparison address data storing section are provided in the vacant area of the attribute memory constituted by RAM and the pre-determined password is made changeable, the address data and password can be respectively changed beforehand. As a result, access by the information processing apparatus, not having security system apparatus of the present invention introduced therein, to the memory card having the security system apparatus of the present invention becomes further difficult, making it possible to keep secret the data in the memory card more securely. In addition, since the enciphering control data and the comparison password storing section is in the vacant area of the conventionally used attribute memory, no memory for storing the enciphering control data and comparison password storing section need be added. Thus, reduction in the cost can be achieved.

Furthermore, the enciphering control data storing section, the comparison address data storing section and the comparison password storing section are provided in the vacant area of the attribute memory composed of RAM and the predetermined address data and the predetermined password are made changeable. As a result, the address data and the password can be respectively changed beforehand and access by the information processing apparatus, having no security system apparatus of the present invention introduced therein, to a memory card with the security system apparatus introduced therein becomes more difficult, making it possible to maintain the secrecy of the data in the memory card more securely. Furthermore, since the coding control data, the comparison address data storing section, and the password storing section are provided in the vacant area in the conventionally used attribute memory, no memory for storing the enciphering control data, the comparison address data storing section and the comparison password storing section are newly added. Thus, reduction in cost increase can be achieved.

Although the present invention has been fully described in connection with the preferred embodiments thereof with reference to the accompanying drawings, it is noted that various changes and modifications will be apparent to those skilled in the art. Such changes and modifications are to be understood as included within the scope of the present invention as defined by the appended claims unless they depart therefrom.

What is claimed is:

1. A memory card system comprising:
   a memory card including;
      an enciphering control data storing section for storing coded enciphering control data which, when decoded, reveals a predetermined password,
      a main memory section for storing data,
      a comparison password storing section for storing the predetermined password as a reference password,
      a password comparison section for comparing the reference password with a password input from a host information processor, and
      an access control section for controlling access to said main memory section in accordance with the results of the comparison performed by said password comparison section; and
   a host information processing device which includes a data decoding section for retrieving and decoding the enciphering control data from said enciphering control data storing section of said memory card to reveal a predetermined password, and outputting the predetermined password to said password comparison section of said memory card;
   wherein said access control section of said memory card allows access to said main memory of said memory card when the password input to said password comparison section of said memory card by said host information processing device matches the reference password stored in said comparison password storing section of said memory card.

2. The memory card system according to claim 1, wherein said access control section allows access to said main memory section when said password comparison section determines that the reference password and the password input from said information processing apparatus match.

3. A memory card system comprising:
   a memory card including;
      an enciphering control data storing section for storing coded enciphering control data which, when decoded, reveals predetermined address data and a predetermined password,
      a main memory section for storing data,
      a comparison address data storing section for storing the predetermined address data as reference address data;
      a comparison password storing section for storing the predetermined password as a reference password,
      an address comparison section for comparing the reference address stored in said comparison address data storing section with address data input from a host information processing device;
      a password comparison section for comparing the reference password stored in said comparison password storing section with a password input from a host information processing device, and
      an access control section for controlling access to said main memory section in accordance with the results of the comparisons performed by said address comparison section and said password comparison section; and
   a host information processing device which includes a data decoding section for retrieving and decoding the enciphering control data from said enciphering control data storing section of said memory card to reveal predetermined address data and a predetermined password, and outputting the predetermined address data and predetermined password to said address data comparison section and said password comparison section of said memory card respectively;
   wherein said access control section of said memory card allows access to said main memory of said memory card when the address data input to said address data comparison section by said information processing device matches the reference address data stored in said comparison address data storing section and the password input to said password comparison section of said memory card by said host information processing device matches the reference password stored in said comparison password storing section of said memory card.

4. The memory card system according to claim 3, wherein said access control section allows access to said main memory section by the information processing device when said address data comparison section determines that the address data input by said information processing device and the reference address data stored in said comparison address data storing section match and said password comparison section determines that the password input by said information processing device and the reference password stored in said comparison password storing section match.

5. The memory card system according to claim 3, wherein said enciphering control data storing section is provided in an attribute memory for storing attribute information of said memory card.

6. The memory card system according to claim 5, wherein the predetermined password is renewable.

7. The memory card system according to claim 3, wherein said enciphering control data storing section and said comparison password storing section are provided in an attribute memory constituted by RAM for storing attribute information of said memory card.

8. The memory card system according to claim 3, wherein the predetermined address data and the predetermined password are renewable.

9. The memory card system according to claim 3, wherein said enciphering control data storing section, said comparison address data storing sections and said comparison password storing section are provided in an attribute memory composed of RAM for storing attribute information of said memory card.

10. The memory card system according to claim 3, wherein said access control section prohibits access to said main memory section by placing said main memory section in a stand-by-state during which data cannot be written to or read from said main memory section.

11. The memory card system according to claim 10, wherein said access control section allows access to said main memory section by enabling said main memory section.

12. A memory card for use in an information processing device having a decoder, said memory card comprising:
    an enciphering control data storing section for storing enciphering control data from which a predetermined password can be obtained;
    a main memory section for storing data;
    a comparison password storing section for storing the predetermined password as a reference password;
    a password comparison section for comparing the reference password with a password obtained by the information processing device through decoding the enciphering control data; and
    an access control section for controlling access to said main memory section in accordance with the comparison result of said password comparison section,
    wherein said access control section prohibits access to said main memory section by the information processing apparatus when said password comparison section determines that the reference password and the password input from the information processing device do not match.

13. A memory card according to claim 12, wherein said access control section allows access to said main memory section by the information processing device when said password comparison section determines that the password input by the information processing device matches the reference password stored in said comparison password storing section.

14. A memory card for use with an information processing device having a decoder, said memory card comprising:
    an enciphering control data storing section for storing enciphering control data from which predetermined address data and a predetermined password can be obtained by decoding;
    a main memory section for storing data;
    a comparison address data storing section for storing the predetermined address data as reference address data;
    a comparison password storing section for storing the predetermined password as a reference password;
    an address data comparison section for comparing the reference address data with address data obtained by the information processing device through decoding the enciphering control data;
    a password comparison section for comparing the reference password with a password obtained by the information processing device through decoding the enciphering control data; and
    an access control section for controlling access to said main memory section in accordance with the comparison results of said password comparison section and said password comparison section,
    wherein said access control section prohibits access to said main memory section by the information processing device when said address data comparison section determines that the address data input by the information processing device and the reference address data stored in said comparison address data storing section do not match or said password comparison section indicates that the password obtained by the information processing device and the reference password stored in said comparison password storing section do not match.

15. The memory card according to claim 14, wherein said access control section is arranged to allow access to said main memory section by the information processing device only when said address data comparison section determines that address data input by the information processing device and the reference address data stored in said comparison address data storing section match and said password comparison section determines that the password input by the information processing device and the reference password stored in said comparison password storing section match.

16. The memory card according to claim 14, wherein said enciphering control data storing section is provided in an attribute memory for storing attribute information of said memory card.

17. The memory card according to claim 16, wherein the predetermined password is renewable.

18. The memory card according to claim 14, wherein said enciphering control data storing section and said comparison password storing section are provided in an attribute memory constituted by RAM for storing attribute information of said memory card.

19. The memory card according to claim 14, wherein the predetermined address data and the predetermined password are renewable.

20. The memory card according to claim 19, wherein said enciphering control data storing section, said comparison address data storing section, and said comparison password storing section are provided in the attribute memory constituted by RAM for storing attribute information of said memory card.

* * * * *